United States Patent
Bordonaro et al.

(10) Patent No.: US 7,403,501 B2
(45) Date of Patent: Jul. 22, 2008

(54) SYSTEM AND METHOD FOR IMPLEMENTING SUPPRESSION IN A COMMUNICATIONS ENVIRONMENT

(75) Inventors: Frank G. Bordonaro, Cary, NC (US); Barry V. Fussell, Clayton, NC (US); John P. Fussell, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 532 days.

(21) Appl. No.: 11/120,784

(22) Filed: May 3, 2005

(65) Prior Publication Data
US 2006/0251063 A1 Nov. 9, 2006

(51) Int. Cl.
*H04Q 7/00* (2006.01)
(52) U.S. Cl. .................. 370/328; 370/389; 370/338; 370/352
(58) Field of Classification Search ............. 370/203, 370/233, 442, 352, 389, 395.1, 395.6, 338, 370/229, 230, 328
See application file for complete search history.

(56) References Cited

U.S. PATENT DOCUMENTS

| | | | | |
|---|---|---|---|---|
| 5,737,314 A * | 4/1998 | Hatono et al. | ............... | 370/235 |
| 5,894,557 A | 4/1999 | Bade et al. | ............. | 395/200.58 |
| 6,134,245 A | 10/2000 | Scarmalis | ................... | 370/474 |
| 6,192,051 B1 | 2/2001 | Lipman et al. | ............. | 370/389 |
| 6,363,065 B1 | 3/2002 | Thornton et al. | ............ | 370/352 |
| 6,400,722 B1 | 6/2002 | Chuah et al. | ............... | 370/401 |
| 6,477,595 B1 | 11/2002 | Cohen et al. | ............... | 710/105 |
| 6,512,754 B2 | 1/2003 | Feder et al. | ................. | 370/338 |
| 6,512,773 B1 | 1/2003 | Scott | .................... | 370/395.61 |
| 7,110,349 B2 * | 9/2006 | Branlund et al. | ............ | 370/203 |

* cited by examiner

*Primary Examiner*—Joseph Feild
*Assistant Examiner*—S. Smith
(74) *Attorney, Agent, or Firm*—Baker Botts L.L.P.

(57) ABSTRACT

A method for communicating data is provided that includes receiving a plurality of cells associated with a communications flow and determining whether one or more of the cells included in the flow should be suppressed, whereby a selected one or more of the cells are suppressed. The method also includes identifying cells that cannot be suppressed and suppressing portions thereof.

30 Claims, 5 Drawing Sheets

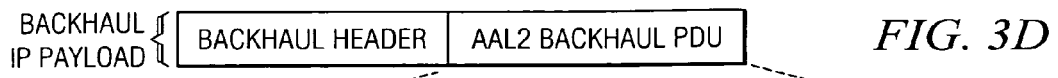
*FIG. 3D*
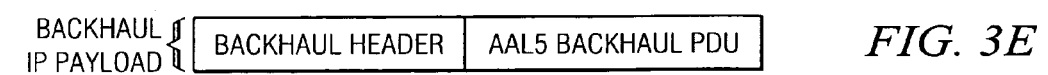
*FIG. 3E*
*FIG. 3F*
*FIG. 4*
| AAL0 PAYLOAD | ATM CELLS REQUIRED (BYTES) | ATM BYTES REMOVED | PADDING BYTES REMOVED | BH PROTOCOL OVERHEAD (TOTAL BYTES) | BANDWIDTH PERCENTAGE USED OVER 5 CELL TIME PERIOD |
|---|---|---|---|---|---|
| 20 | 1(53) | 5 | 28 | 14(34) | 13% |
| 30 | 1(53) | 5 | 18 | 14(44) | 17% |
| 60 | 2(106) | 10 | 36 | 17(77) | 29% |
| 90 | 2(106) | 10 | 6 | 17(117) | 44% |
| 120 | 3(159) | 15 | 24 | 20(140) | 53% |
| 150 | 4(212) | 20 | 42 | 23(173) | 65% |
| 180 | 4(212) | 20 | 12 | 23(203) | 77% |
| 210 | 5(265) | 25 | 30 | 26(236) | 89% |
| 240 | 5(265) | 25 | 0 | 26(266) | 100.4% |

| AAL5 SIGNALING FRAME SIZE | ATM CELLS REQUIRED | ATM/AAL5 BYTES REMOVED | CELL PADDING REMOVED | BH PROTOCOL OVERHEAD ADDED* | BANDWIDTH PERCENTAGE GAINED |
|---|---|---|---|---|---|
| 8 | 1(53 BYTES) | 13 | 32 | 13 | 60% |
| 12 | 1(53 BYTES) | 13 | 28 | 13 | 53% |
| 20 | 1(53 BYTES) | 13 | 20 | 13 | 38% |
| 30 | 1(53 BYTES) | 13 | 10 | 13 | 19% |
| 40 | 1(53 BYTES) | 13 | 0 | 13 | 0% |
| 60 | 2(106 BYTES) | 18 | 28 | 13 | 31% |
| 80 | 2(106 BYTES) | 18 | 8 | 13 | 12% |
| 88 | 2(106 BYTES) | 18 | 0 | 13 | 5% |
| 100 | 3(159 BYTES) | 23 | 36 | 13 | 29% |
| 120 | 3(159 BYTES) | 23 | 16 | 13 | 16% | ously
SYSTEM AND METHOD FOR IMPLEMENTING SUPPRESSION IN A COMMUNICATIONS ENVIRONMENT

TECHNICAL FIELD OF THE INVENTION

The present invention relates in general to the field of communications and, more particularly, to a system and a method for implementing suppression in a communications environment.

BACKGROUND OF THE INVENTION

Communication systems and architectures have become increasingly important in today's society. One aspect of communications relates to maximizing bandwidth and minimizing delays associated with data and information exchanges. Many architectures for effectuating proper data exchanges can add significant overhead and cost in order to accommodate a large number of end-users or data streams. For example, a large number of T1/E1 lines may be implemented to accommodate heavy traffic, but such lines are generally expensive and, thus, usage of each one should be maximized (to the extent that it is possible) in order to achieve a system benefit per-unit of cost.

Compression techniques can be used by network operators to produce high percentages of bandwidth savings. In certain scenarios, network operators may consider compressing common communication patterns that appear on a given communication link. However, many of the existing compression/suppression protocols are deficient because they are static, unresponsive, and rigid. Moreover, many such systems add overhead to the system, while not yielding a sufficient offsetting bandwidth gain. Accordingly, the ability to provide a communications system that consumes few resources, optimizes bandwidth, and achieves minimal delay presents a significant challenge for network operators, service providers, and system administrators.

SUMMARY OF THE INVENTION

From the foregoing, it may be appreciated by those skilled in the art that a need has arisen for an improved suppression approach that optimizes data exchanges in a communications environment. In accordance with one embodiment of the present invention, a system and a method for providing protocols for suppressing data are provided that substantially eliminate or greatly reduce disadvantages and problems associated with conventional compression/suppression techniques.

According to one embodiment of the present invention, a method for communicating data is provided that includes receiving a plurality of cells associated with a communications flow and determining whether one or more of the cells included in the flow should be suppressed, whereby a selected one or more of the cells are suppressed. The method also includes identifying cells that cannot be suppressed and suppressing portions thereof.

In more particular embodiments, the method includes bundling, over a time interval, the selected cells included in the flow in an IP packet to be communicated to a next destination. In still other embodiments, the selected cells may be received and evaluated in order to restore a plurality of bits associated with the communications flow. In some embodiments, the portions that are suppressed reflect data segments associated with ATM headers, ATM padding, or ATM trailers. The ATM headers can be mapped to one or more backhaul values.

Certain embodiments of the present invention may provide a number of technical advantages. For example, according to one embodiment of the present invention, a communications approach is provided that enhances bandwidth parameters for a given architecture. This is a result of the suppression scheme, which yields bandwidth gains by recognizing a given input bit stream as a candidate for suppression. Subsequently, the bit pattern is not transmitted over the backhaul, whereby the suppressed data can be simply played out or restored on the other end of the link.

Furthermore, the bandwidth savings provided by the present invention can be produced without any increase in the complexity of multiplexing and demultiplexing schemes. Such an upgrade or enhancement may be provided to an existing system with minimal effort. A simple algorithm may be used to leverage infrastructure already in place. Thus, a complete system overhaul is not necessary. Such advantages may be particularly beneficial to service providers, as effective compression protocols significantly reduce their operating expenditures.

Note also that such an enhancement is flexible in that it can be extended to include a multitude of compressible, common, repetitive patterns. Thus, such a solution can be easily extended to signaling and packet data channels. This further allows such a configuration to accommodate a wide range of incoming flows, as it may be applicable to a number of different types of traffic arrangements. Additionally, minimal overhead is incurred as a result of the operations of the present invention.

Certain embodiments of the present invention may enjoy some, all, or none of these advantages. Other technical advantages may be readily apparent to one skilled in the art from the following figures, description, and claims.

BRIEF DESCRIPTION OF THE DRAWINGS

For a more complete understanding of the present invention and the advantages thereof, reference is made to the following description taken in conjunction with the accompanying drawings, wherein like reference numerals represent like parts, in which:

FIGS. 3A-F are simplified block diagrams representing various frame formats that may propagate through the system;

FIGS. 4-5 are simplified charts illustrating some of the efficiencies that may be achieved by the communication system; and FIGS. 6-9 are simplified block diagrams representing various frame formats that may propagate through the system.

DETAILED DESCRIPTION OF THE INVENTION

Figure 1:
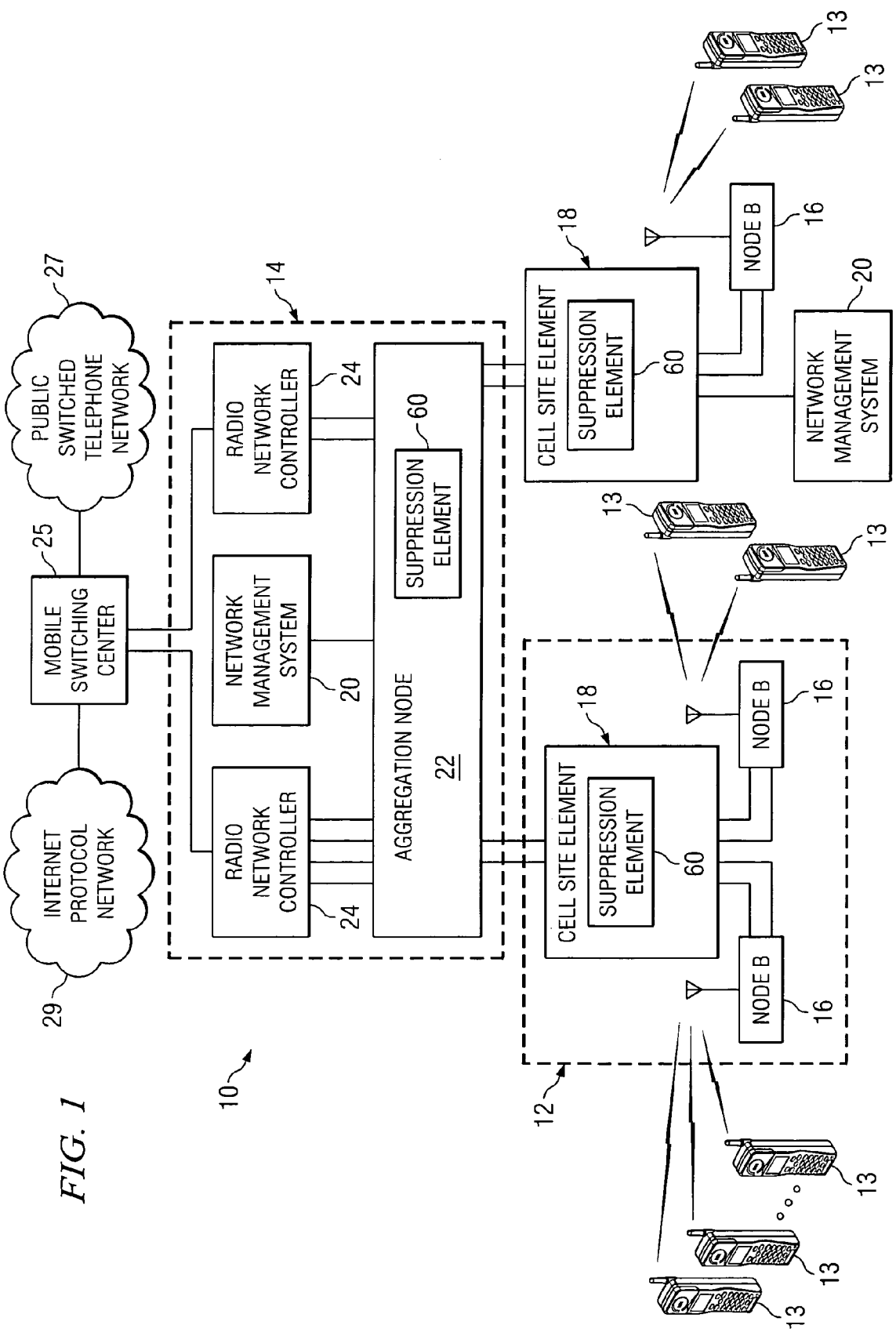
FIG. 1 is a simplified block diagram of a communication system for suppressing data in a network environment.

FIG. 1 is a simplified block diagram of a communication system 10 for suppressing data in a communications environment. Communication system 10 may include a plurality of cell sites 12, a plurality of mobile stations 13, a central office site 14, a plurality of Node Bs 16, a plurality of cell site elements 18, and a network management system 20. Additionally, communication system 10 may include an aggregation node 22, a plurality of radio network controllers (RNCs) 24, a mobile switching center 25, a public switched telephone network (PSTN) 27, and an Internet protocol (IP) network 29. Note the communications links extending between cell site element 18 and aggregation node 22, as compared to the number of communication links extending between cell site element 18 and Node Bs 16. This arrangement has been provided in order to illustrate that without the present invention, the number of communication links between cell site 12 and central office site 14 would be equal to the output of Node Bs 16. By implementing the suppression techniques of the present invention (and as explained in greater detail below), a reduction in communication links between cell site 12 and central office site 14 is achieved.

Communication system 10 may generally be configured or arranged to represent 3G architecture applicable to a Universal Mobile Telecommunications System (UMTS) environment in accordance with a particular embodiment of the present invention. However, the 3G architecture is offered for purposes of example only and may alternatively be substituted with any suitable networking system or arrangement that provides a communicative platform for communication system 10. For example, the present invention may be used in conjunction with data communications, such as those that relate to packet data transmissions.

As illustrated in FIG. 1, a backhaul network exists between a Node B and an RNC. The backhaul can be used to transmit voice conversations, data, and control information using various standards and proprietary vendor-specific formats. In order to address operational expenses, a backhaul optimization scheme is desired that will provide significant bandwidth savings, while maintaining low latency and consistent end-to-end transmissions for all possible frame types.

In accordance with the teachings of the present invention, communication system 10 operates to suppress unused, idle, and redundant information in offering an optimal solution for the backhaul network. Communication system 10 attempts to optimize the backhaul between Node-B and RNC by inspecting ATM traffic and by suppressing empty cells, asynchronous transfer mode (ATM) adaptation layer (AAL) overhead, and those parts of the payload that can be reconstructed at the remote end. The bandwidth savings on the backhaul can then be used for other traffic types, including GSM, or it can be used by mobile operators to reduce the amount of backhaul lines between the tower site and the aggregation site.

Using such a protocol, communication system 10 provides a simplistic solution for reducing compression and decompression operations. In addition to creating minimal overhead and being easy to implement (with potential modifications only being made to aggregation node 22 and cell site element 18), such an approach could cooperate with any suitable compression protocol or arrangement. The enhancement in transmission can be provided in both aggregation node 22 and cell site element 18, as the present invention bi-directional.

Note that for purposes of teaching and discussion, it is useful to provide some overview as to the way in which the following invention operates. The following foundational information may be viewed as a basis from which the present invention may be properly explained. Such information is offered earnestly for purposes of explanation only and, accordingly, should not be construed in any way to limit the broad scope of the present invention and its potential applications.

It can be appreciated that ATM data is generally present on the backhaul and the challenge is to convert that into packet switched data such that additional IP traffic can be added to this data. This could maximize the bandwidth available on the backhaul. From another perspective, the bandwidth required to support the ATM data should be reduced where possible.

Another example flow is described and associated with AAL5 and AAL0. AAL0 can carry all types of ATM traffic. In ATM, cells are always being transmitted: even in cases where there is no data in them (i.e. they are idle cells present). The idle cells are suppressed by the present invention such that they are not transmitted over the backhaul. Cell site element 18 can receive an entire ATM cell (53 bytes), which comprises a header (5 bytes) and a payload (48 bytes). The addressing scheme that is used in the ATM header (e.g. the virtual channel identifier/virtual path identifier (VCI/VPI)) is mapped to a backhaul value (e.g. a backhaul header index), which has a local significance between cell site element 18 and aggregation node 22 such that the destination of the cell can be determined. In addition, a bit in the cell (e.g. the least significant bit) which signifies the end of the frame, will be identified. This will be carried across the backhaul.

As can be appreciated, by removing much of the overhead, a new frame (or super-frame) can be built that is much smaller. The new frame can be packetized and then sent across the backhaul. This would achieve a reduction in bandwidth required to communicate information from one location to another and/or reduce the number of E1/T1 lines between Node B 16 and radio network controller 24.

Consider an example in which ATM traffic is propagating from Node B 16 to cell site element 18. The ATM traffic carries signaling data, call set-up data, handover signaling, as well as the bearer or voice traffic. Cell site element 18 can receive ATM traffic that includes raw ATM cells and which has various adaptation layers. The ATM traffic may be optimized in various ways based on the adaptation layer that is being received. Signaling traffic is generally carried over AAL5. For AAL5 traffic, the ATM header, the ATM trailer and, if present, the prevalent ATM padding will be suppressed. The payload is then positioned in an IP packet and sent across over to the aggregation node. Because cells are small, multiple AAL5 packets or cells can be bundled into a single IP packet, which will be sent across the backhaul.

AAL2 traffic is typically used for voice cells and the AAL2 packets are also generally small. In a similar fashion to that of AAL5, for AAL2 traffic the ATM header, the ATM trailer and, if present, the prevalent ATM padding will be suppressed. The ATM voice data can then be carried across the backhaul.

AAL0 traffic processing (or raw cell processing) may be used for various ATM traffic. For AAL0 traffic the ATM header is suppressed and the cell payload is modified (e.g. removing padding provided by trailing 0s) and then this information for is sent across the backhaul. Additional details relating to these operations are provided below with reference to corresponding FIGURES.

The payload will also be analyzed, whereby trailing 0s are trimmed out of the cells. The payload is stored, along with the header information, and then on a periodic basis (e.g. 1 millisecond) the protocol (having gathered several ATM cells worth of data) will package several the ATM data packets into an IP frame. The IP frame is then sent to aggregation node 22.

Aggregation 22 is capable of optimizing the backhaul index information and rebuilding the cells (full cells) from that information. The cells are then transmitted to RNC 24. In a similar fashion, RNC 24 can transmit data by packaging information into multiple cells. Aggregation node 22 may receive the cells and gather the information from the cell header that is needed. Some of this information may include the VCI/VPI, which will map to an index, the payload type indicator (PTI) flag, and the payload. In addition, the trailing 0s may also be trimmed from the cells. All of that information may be stored and once a requisite amount of information has accumulated (e.g. on a periodic 1-millisecond basis), then the information may be positioned into an IP packet that can be transmitted to cell site element 18. Cell site element 18 can pull out and identify each data segment in order to rebuild the cells such that they look like they did when they were received by aggregation node 22. The cells can then be played back to Node B 16.

Turning to the infrastructure of FIG. 1, mobile station 13 may be used to initiate a communication session that may benefit from such a suppression protocol. Mobile station 13 may be an entity, such as a client, subscriber, end-user, or customer that seeks to initiate a data flow or exchange in communication system 10 via any suitable network. Mobile station 13 may operate to use any suitable device for communications in communication system 10. Mobile station 13 may further represent a communications interface for an end-user of communication system 10. Mobile station 13 may be a cellular or other wireless telephone, an electronic notebook, a computer, a personal digital assistant (PDA), or any other device, component, or object capable of initiating a data exchange facilitated by communication system 10. Mobile station 13 may also be inclusive of any suitable interface to the human user or to a computer, such as a display, microphone, keyboard, or other terminal equipment (such as for example an interface to a personal computer or to a facsimile machine in cases where mobile station 13 is used as a modem). Mobile station 13 may alternatively be any device or object that seeks to initiate a communication on behalf of another entity or element, such as a program, a database, or any other component, device, element, or object capable of initiating a voice or a data exchange within communication system 10. Data, as used herein in this document, refers to any type of numeric, voice, video, audio-visual, or script data, or any type of source or object code, or any other suitable information in any appropriate format that may be communicated from one point to another.

Node Bs 16 are communicative interfaces that may comprise radio transmission/reception devices, components, or objects, and antennas. Node Bs 16 may be coupled to any communications device or element, such as mobile station 13 for example. Node Bs 16 may also be coupled to radio network controllers 24 (via one or more intermediate elements) that use a landline (such as a T1/E1 line, for example) interface. Node Bs 16 may operate as a series of complex radio modems where appropriate. Node Bs 16 may also perform transcoding and rate adaptation functions in accordance with particular needs.

In operation, communication system 10 may include multiple cell sites 12 that communicate with mobile stations 13 using Node Bs 16 and cell site element 18. Central office site 14 may use aggregation node 22 and radio network controllers 24 for communicating with cell site 12. One or more network management systems 20 may be coupled to either cell site 12 and central office site 14 (or both as desired), whereby mobile switching center 25 provides an interface between radio network controllers 24 (of central office site 14) and PSTN 27, IP network 29, and/or any other suitable communication network. Node Bs 16 may be coupled to cell site element 18 by a T1/E1 line or any other suitable communication link or element operable to facilitate data exchanges. A backhaul connection between cell site element 18 and aggregation node 22 may also include a T1/E1 line or any suitable communication link where appropriate and in accordance with particular needs.

Radio network controllers 24 generally operate as management components for a radio interface. This may be done through remote commands to a corresponding Node B within a mobile network. One radio network controller 24 may manage more than one Node Bs 16. Some of the responsibilities of radio network controllers 24 may include management of radio channels and assisting in handoff/handover scenarios.

In operation, various traffic protocols (e.g. time division multiplexed (TDM), GSM 8.60 Frame Relay, high level data link control (HDLC), ATM, point to point protocol (PPP) over HDLC, TRAU, vendor-specific formats, etc.) may be used and communicated by each Node B 16 to cell site element 18 of cell site 12. Cell site element 18 may also receive IP or Ethernet traffic from network management system 20. Cell site element 18 may multiplex together payloads from the layer-two based traffic that have a common destination. The multiplexed payloads, as well as any payloads extracted from the network management system IP or Ethernet traffic may be communicated across a link to aggregation node 22 within central office site 14. Aggregation node 22 may demultiplex the payloads for delivery to an appropriate radio network controller 24 or network management system 20.

Mobile switching center 25 operates as an interface between PSTN 27 and radio network controllers 24, and potentially between multiple other mobile switching centers in a network and radio network controller 24. Mobile switching center 25 represents a location that generally houses communication switches and computers and ensures that its cell sites in a given geographical area are properly connected. Cell sites refer generally to the transmission and reception equipment or components that connect elements such as mobile station 13 to a network, such as IP network 29 for example. By controlling transmission power and radio frequencies, mobile switching center 25 may monitor the movement and the transfer of a wireless communication from one cell to another cell and from one frequency or channel to another frequency or channel. In a given communication environment, communication system 10 may include multiple mobile switching centers 25 that are operable to facilitate communications between radio network controller 24 and PSTN 27. Mobile switching center 25 may also generally handle connection, tracking, status, billing information, and other user information for communications in a designated area.

PSTN 27 represents a worldwide telephone system that is operable to conduct communications. PSTN 27 may be any landline telephone network operable to facilitate communications between two entities, such as two persons, a person and a computer, two computers, or in any other environment in which data is exchanged for purposes of communication. According to one embodiment of the present invention, PSTN 27 operates in a wireless domain, facilitating data exchanges between mobile station 13 and any other suitable entity within or external to communication system 10.

IP network 29 is a series of points or nodes of interconnected communication paths for receiving and transmitting packets of information that propagate through communication system 10. IP network 29 offers a communications interface between mobile stations 13 and any other suitable network equipment. IP network 29 may be any local area network (LAN), metropolitan area network (MAN), wide area network (WAN), wireless local area network (WLAN), virtual private network (VPN), or any other appropriate architectural system that facilitates communications in a network environment. IP network 29 implements a transmission control protocol/Internet protocol (TCP/IP) communication language protocol in a particular embodiment of the present invention. However, IP network 29 may alternatively implement any other suitable communications protocol for transmitting and receiving data packets within communication system 10.

Note that in order to provide the expected class of service, communication system 10 can allow PVCs to be provisioned to match those on the Node-B and RNC. Each PVC will be identified with VCI/VPI and class of service so that it can operate within the same parameters expected by the Node-B and RNC. If the Node-B and RNC support proprietary PVCs for management they must be identified by provisioning on the MWR, so that traffic will flow unmodified and unoptimized.

Both cell site element 18 and aggregation node 22 include a suppression element 60. In one embodiment, suppression element 60 is an algorithm (potentially included in appropriate software) that achieves the suppressing operations as described herein.

The collected samples may be compared to a few pre-identified (or previously learned) patterns (e.g. the previously occurring input streams) and decisions may be made regarding which bits are to be suppressed with a corresponding header representing that the data has been suppressed. The receiving end may then perform reverse operations in accounting for the suppression in order to restore the bit stream and, potentially, to then communicate it to its intended next destination. Thus, a demultiplexer/decompressor (not shown) may perform tasks in reverse in order to undo what was done by the compressor and the multiplexer, which can be included within aggregation node 22 and/or cell site element 18.

It is critical to note that suppression element 60 may be changed considerably, as it offers only one example suppression protocol configuration that accommodates any of the identified incoming bit patterns. Any number of alternative bit patterns may be readily accommodated by communication system 10 and are, therefore, included in the broad scope of its teachings. These common patterns may be based on particular communication needs or on the prevalence of commonly reoccurring bit patterns in a given communications architecture. Additionally, any attached header bits may also provide E1/T1 line conditions and alarms. In other embodiments, additional bits may be added to the header bits in order to provide any number of functions, such as control parameters, the state of the given communication link, the condition of the E1/T1 line, the condition of an alarm, or the identification of a certain packet. Thus, these extra bits may provide any suitable additional information that may be relevant to a communication session occurring in communication system 10. Additionally, suppression element 60 can be used to transport any ATM cell stream over IP.

Before turning to the next FIGURE, it is critical to note that the use of the terms 'aggregation node' and 'cell site element' herein in this document only connotes an example representation of one or more elements associated with Node B 16 and radio network controller 24. These terms have been offered for purposes of example and teaching only and do not necessarily imply any particular architecture or configuration. Moreover, the terms 'cell site element' and 'aggregation node' are intended to encompass any network element that is operable to facilitate a data exchange in a network environment. Accordingly, cell site element 18 and aggregation node 22 may be routers, switches, bridges, gateways, interfaces, or any other suitable module, device, component, element or object operable to effectuate one or more of the operations, tasks, or functionalities associated with compressing data as implied, described, or offered herein.

As identified above, each of these elements may include software (e.g. within suppression element 60) and/or an algorithm to effectuate suppression for voice or packet data applications as described herein. Alternatively, such suppression operations and techniques may be achieved by any suitable hardware, component, device, application specific integrated circuit (ASIC), additional software, field programmable gate array (FPGA), processor, algorithm, erasable programmable ROM (EPROM), electrically erasable programmable ROM (EEPROM), or any other suitable object that is operable to facilitate such operations. Considerable flexibility is provided by the structure of cell site element 18 and aggregation node 22 in the context of communication system 10. Thus, it can be easily appreciated that such a function could be provided external to cell site element 18 and aggregation node 22. In such cases, such a functionality could be readily embodied in a separate component, device, or module.

Figure 2:
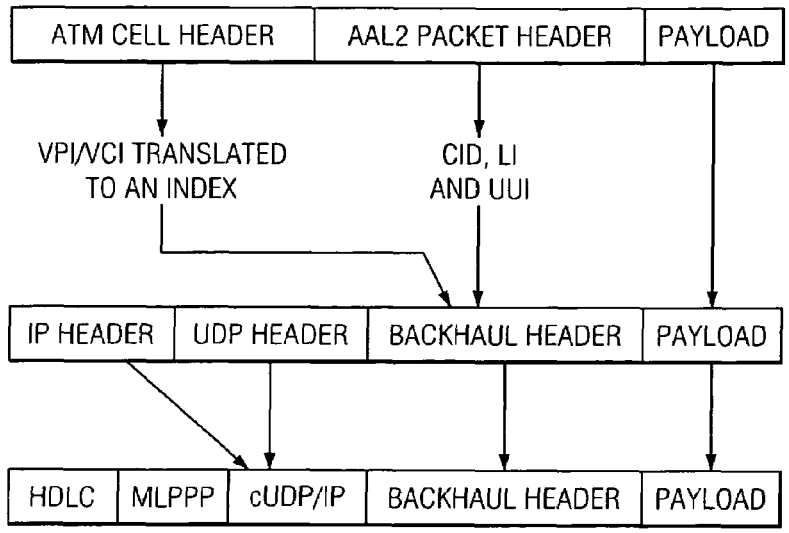
FIG. 2 is a simplified block diagram of a basic frame format that may be used in the system.

FIG. 2 is simplified block diagram that shows the protocol translation concept associated with the present invention. In this example, a VPI/VCI from the ATM cell header is translated to a backhaul value (i.e. index), which correlates to the backhaul header. In addition, the AAL2 packet header, which includes the channel identification (CID), LI, and UUI is mapped to the backhaul header. The payload remains unchanged during this mapping operation.

Figure 3A:
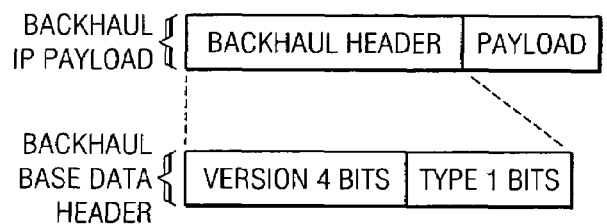
Figure 3B:
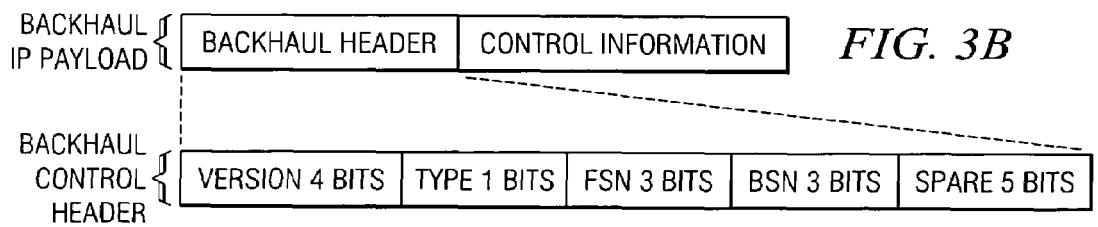
Figure 3C:
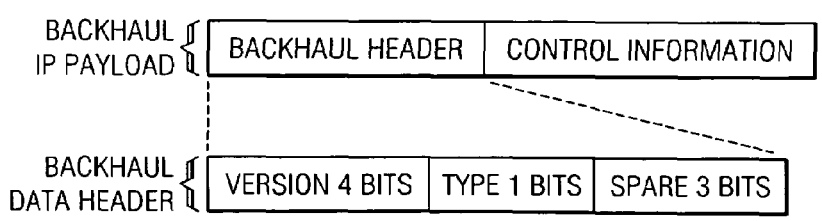

FIG. 3A is a simplified block diagram illustrating two example frame formats. There are two types of UMTS backhaul packets: control and data. The base backhaul header consists of a 4-bit version field and a packet type bit to identify which type of information is present: control or data. FIGS. 3B-3C illustrate how the backhaul header is mapped to the backhaul control header. Control packets are used to validate configuration, as well as exchange alarm information. Control packets are sequenced for the purposes of retransmission.

There are three types of backhaul data packets. Data packet headers consist of the base backhaul header and a 3-bit spare field. Each bundled protocol data unit (PDU) within the backhaul packet must have enough information to identify its type, length, and its associated permanent virtual circuit (PVC) index. FIG. 3D illustrates one example frame formatting associated with AAL2 traffic. FIG. 3E illustrates another example frame formatting associated with AAL5 traffic. The third type of backhaul data packet is used for raw ATM traffic, such as operation and maintenance (OAM), which is illustrated by FIG. 3F. Note that there could be multiple cells within the IP packet. Each of these packages represent a cell that can be put into an IP packet. For example, if five cells are to be sent every 1 millisecond, then five of these cells would be provided in the IP packet. This is in contrast to GSM, which generally does not perform bundling operations.

ATM backhaul packet transmission is triggered by a 1-millisecond timer. The timer value can be chosen based on link type and can vary (e.g. from 1.1 to 1.38 milliseconds depending on E1/T1). Upon each timer interrupt, any ATM packets that were received will be packaged in a single backhaul packet and transmitted to the peer.

The demultiplexing may be performed on the received IP packet. Each ATM packet is copied from the IP packet and forwarded to the segmentation and reassembly (SAR) for transmission immediately. Jitter adjustments for ATM/AAL voice and data can be handled by the end devices, RNC and Node B. They utilize techniques such as jitter time stamp (JTS) or synchronous residual time stamp (SRTS), which measure round trip time and timestamps to make any needed jitter adjustments.

There are a few special cases that must be handled outside of the normal UMTS data on the ATM interfaces. Some, such as integrated local management interface (ILMI), can be addressed using the same PVC configuration as a UMTS signaling PVC. These can be processed similar to the UMTS signaling traffic since it utilizes AAL5 on its own PVC.

OAM cells can be identified by the PTI field in the ATM cell header. OAM can be used for continuity checks, loop back, alarm indication and remote detection indication. F4 type OAM requires its own PVC and operates at the path level. F4 type OAM alarm information will be translated to/from backhaul control packets, however the loop back and link test cells will be forwarded over the IP backhaul with little optimization gained.

Backhaul control frames are used to negotiate capabilities, verify provisioning and propagate state of the local Iub interface to the remote peer. The state of an Iub interface can be driven by its administrative and alarm status.

When bringing up the backhaul peer, a control frame describing provisioning of the local Iub interface is sent to the remote node. The mandatory information in this frame includes: type of interfaces (E1/T1/IMA), PVCs, traffic class, and version.

This control frame will be re-transmitted periodically until acknowledged by the remote. The frame can be transmitted in intervals of 5 second to 5 minutes using a backoff algorithm. The Iub interface will remain down and nothing will be transmitted to the UMTS node until the same information is received from the remote. In case the remote Iub is provisioned in a non-compatible manner, the Iub interface will be taken down. Syslog and simple network management protocol (SNMP) are used to notify the user.

Peer status is communicated by using backhaul control messages. Control messages consist of a backhaul and zero or more control fields. A backhaul frame without control fields is used to acknowledge control information. Backhaul control frames are repeated until acknowledged. The peer state is transitioned is when the first control frame is send out.

In operation of an example embodiment, consider a case where an end user is having a conversation using a mobile station. In a typical environment, the mobile station exchanges information with the cell site. In a native environment, Node B 16 receives this information and converts it into ATM cells. There is control information that is exchanged (on another channel) between Node B 16 and radio network controller 24 (over an E1 link 40) that indicates which channel or which sub-rate that will be assigned for this call.

The suppression changes based on the data that is being communicated. In addition, protocols such as HDLC can be significantly optimized such that flags will synchronize or line-up such that they are compressed out. Similarly, idle frames (or idle periods between frames) or silence will readily be compressed.

Figures 5, 6:
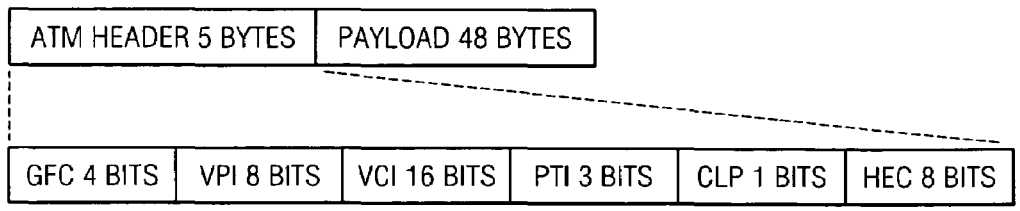

FIGS. 4-5 are simplified charts illustrating some of the efficiencies that may be achieved by communication system 10. Due to the nature of E1 framing for ATM, the maximum available bandwidth is 1920 Kbps. The maximum available bandwidth for an E1 HDLC is 1984 Kbps. Note that there is a layer-one gain for E1 of 64 Kbps simply due to the change in L1 types (i.e. ATM to HDLC). For T1 links, there is generally no layer-1 gain associated with converting the link from ATM to HDLC, both having a maximum bandwidth of 1536 Kbps.

In one embodiment, all of the ATM header will be suppressed or mapped and regenerated by the remote end. For each ATM cell, a gain of 5 bytes is made. In one particular example, the following mapping will occur: GFC (4-bits), which is suppressed and regenerated as needed by the peer; VCI (8-bits), which is mapped to the backhaul header index and regenerated by the peer; VPI (16-bits), which is mapped to the backhaul header index and regenerated by the peer; PTI(3-bits), which is suppressed for AAL5 and AAL2 traffic, OAM cells are processed unmodified or forwarded as raw cells; CLP (1-bit), which is suppressed and regenerated as needed by the peer; and HEC (8-bits), which is recalculated on each outbound cell by the peer.

Idle ATM cells will be filtered by the SAR. IMA filler cells will be filtered by the SAR when IMA is used. Optimization gains here are dependent upon the overall use of the Iub interface and can vary from a great deal to very little. On an E1, 45 idle/filler cells per second provides 1% bandwidth gain.

Raw cells and AAL0 PVCs will generate the backhaul utilization represented by FIG. 4. By defining a PVC as AAL0, it may be used to backhaul any ATM traffic including AAL2 and AAL5 UMTS traffic. Depending on the peer device capabilities, AAL0 PVCs may be needed to transport AAL2 traffic as well as any AAL0 traffic.

Optimization can be performed on AAL0 PVCs by removing the ATM header and removing any trailing zeros in the cell payload. AAL2 protocol requires that any cell padding be set to zero. This allows optimization to remove any trailing zeros and append them again at the remote node and, thereby, saving backhaul bandwidth.

AAL5 traffic will contain SSCOP control and data packets. The SAR will have removed the AAL5 header, trailer, and padding prior to reaching IOS. The PVC can be identified by an index in the backhaul packet so the remote end can correctly direct the packet to the appropriate PVC.

The gains associated with AAL5 traffic are also greatly dependent upon padding. For each byte of padding per cell add an additional 2% gain. This is very much evident in control packets, which are typically 4-12 bytes with the remaining 36-44 bytes in padding/trailer. The table represented by FIG. 5 outlines the optimization capabilities based on signaling frame size. Signaling packets can vary from a few bytes to a few hundred bytes. AAL5 bandwidth gains are calculated on a per AAL5 packet basis due to AAL5s lack of sub-cell multiplexing. Small packet sizes, for example 8-12 bytes, are common for the signaling protocols NBAP and ALCAP. These small packets are used for POLL and STAT packets for the SSCOP protocol used by signaling.

Its important to understand that AAL5 packets will be rebuilt identically by the peer since each packet starts at the beginning of a cell and ends at the end of a cell (when the padding and the trailer associated with the packet are accounted for). AAL2 traffic will contain the most latency critical information including voice, data, and video. Using sub-cell multiplexing more than one AAL2 packet can be put into a single cell. The packets may overrun one cell and into another. The SAR will optimize out any padding from the AAL2 traffic.

Optimization gains here may include 5 bytes of ATM header, one byte from the AAL2 CPS PDU header (OSF), and parts of the AAL2 CPS packet for each AAL2 packet, and any cell padding.

FIGS. 6-9 are simplified diagrams illustrating additional example formatting protocols. In the AAL0 cell of FIG. 6, the GFC is discarded, the VPI/VCI combination gets mapped to a backhaul identification value, the least significant bit is carried across the backhaul, the cell loss priority (CLP) bit indicates whether or not the packet can be dropped (this is generally of value to an ATM switch), and the header error control (HEC) bits are discarded. If AAL5 is being carried, then most of the payload will be sent. If AAL2 is propagating along the backhaul, then trailing 0s will be trimmed from the payload.

Figure 7:
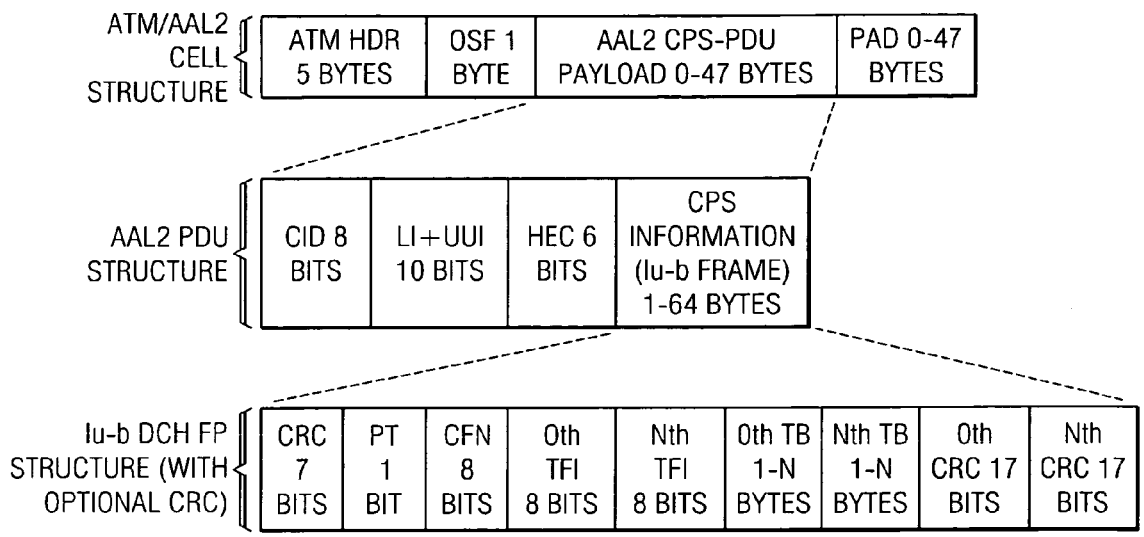
Figure 8:
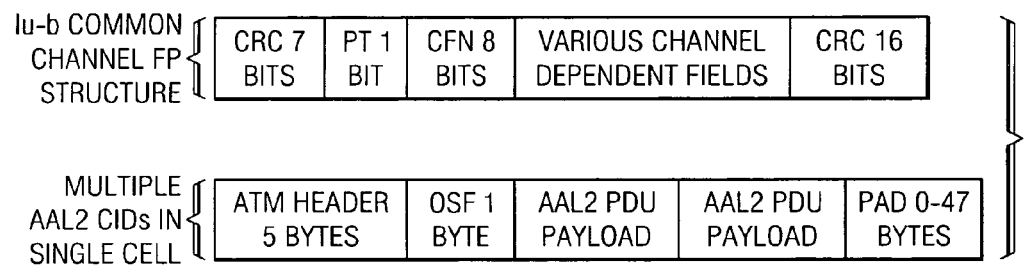
Figure 9:
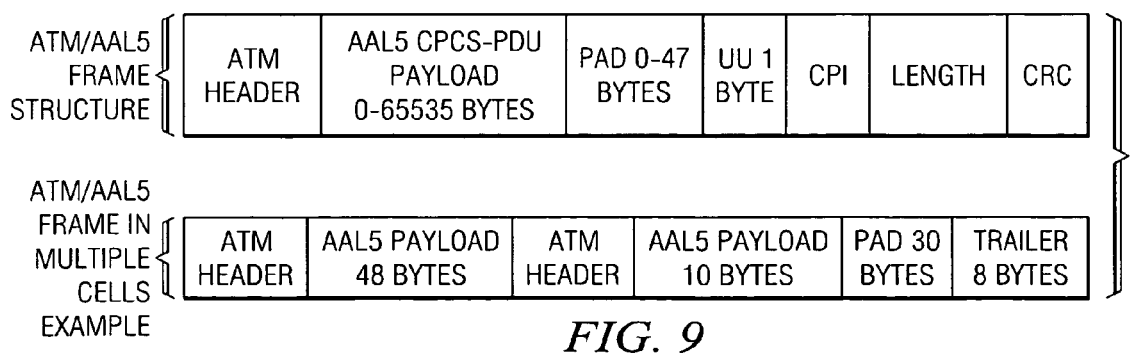

FIG. 7 illustrates the AAL2 frame format, along with the frame protocol (FP) format. The second part of FIG. 7 illustrates an AAL2 PDU structure and the subsequent part illustrates an Iu-b dedicated channel (DCH) FP structure. FIG. 8 illustrates an Iu-b common channel FP structure. The second portion of FIG. 8 represents multiple AAL2 CIDs in a single cell. FIG. 9 illustrates AAL5 type frames. The second part of FIG. 9 illustrates a multiple-cell example.

It should be noted that some of the steps discussed in the preceding FIGURES may be changed or deleted where appropriate and additional steps may also be added to the process flows. These changes may be based on specific communication system architectures or particular networking arrangements or configurations and do not depart from the scope or the teachings of the present invention.

Although the present invention has been described in detail with reference to particular embodiments illustrated in FIGS. 1 through 9, it should be understood that various other changes, substitutions, and alterations may be made hereto without departing from the spirit and scope of the present invention. For example, although the present invention has been described with reference to a number of elements included within communication system 10, these elements may be rearranged or positioned in order to accommodate any suitable routing, compression, and suppression techniques. In addition, any of the described elements may be provided as separate external components to communication system 10 or to each other where appropriate. The present invention contemplates great flexibility in the arrangement of these elements as well as their internal components.

In addition, although the preceding description offers a suppression protocol to be implemented with particular devices (e.g. aggregation node 22 and cell site element 18), the compression/suppression protocol provided may be embodied in a fabricated module that is designed specifically for effectuating the techniques discussed above. Moreover, such a module may be compatible with any appropriate protocol, other than those discussed herein, which were offered for purposes of teaching and example only.

It should also be noted that the suppression and optimization techniques discussed herein are not specific to UMTS, as these techniques could be employed with any ATM network. In a similar vein, the proposed methods could be implemented in part and not necessarily architected together.

Numerous other changes, substitutions, variations, alterations, and modifications may be ascertained to one skilled in the art and it is intended that the present invention encompass all such changes, substitutions, variations, alterations, and modifications as falling within the scope of the appended claims.

What is claimed is:

1. An apparatus for communicating data, comprising:
   a cell site element associated with a Node B and operable to receive a plurality of cells associated with a communications flow, wherein the cell site element is further operable to determine whether one or more of the cells included in the flow should be suppressed, and wherein the cell site element is further operable to suppress a selected one or more of the cells, whereby the cell site element suppresses unused, idle, and redundant information propagating along a backhaul network coupled to the cell site element, the cell site element inspecting ATM traffic and suppressing empty cells and asynchronous transfer mode (ATM) adaptation layer (AAL) overhead such that they can be reconstructed at a remote end of the backhaul network.

2. The apparatus of claim 1, wherein over a time interval the cell site element is further operable to bundle the selected cells included in the flow in an IP packet to be communicated to a next destination.

3. The apparatus of claim 2, wherein the selected cells may be received and evaluated in order to restore a plurality of bits associated with the communications flow.

4. The apparatus of claim 2, wherein the portions that are suppressed reflect data segments associated with ATM headers, ATM padding, or ATM trailers.

5. The apparatus of claim 4, wherein the ATM headers are mapped to one or more backhaul values.

6. The apparatus of claim 2, wherein the cell site element is operable to suppress unused portions of ATM payloads associated with the flow.

7. The apparatus of claim 2, wherein the IP packet is demultiplexed at the next destination and the selected cells are rebuilt by reconstructing ATM cell headers and cell payloads.

8. The apparatus of claim 2, wherein the cell site element is operable to evaluate bit positions of a current cell to determine an end of a frame.

9. The apparatus of claim 2, wherein the cell site element includes a suppression element that is operable to perform the suppression operations.

10. The apparatus of claim 2, further comprising:
    an aggregation node associated with a RNC and operable to communicate with the cell site element and to receive the IP packet.

11. The apparatus of claim 2, wherein the communications flow is associated with asynchronous transfer mode (ATM) adaptation layer zero (AAL0).

12. A method for communicating data, comprising:
    receiving a plurality of cells associated with a communications flow;
    determining whether one or more of the cells included in the flow should be suppressed;
    suppressing a selected one or more of the cells; and
    identifying cells that cannot be suppressed and to suppress portions thereof, whereby a cell site element suppresses unused, idle, and redundant information propagating along a backhaul network coupled to the cell site element, the cell site element inspecting ATM traffic and suppressing empty cells and asynchronous transfer mode (ATM) adaptation layer (AAL) overhead such that they can be reconstructed at a remote end of the backhaul network.

13. The method of claim 12, further comprising:
    bundling, over a time interval, the selected cells included in the flow in an IP packet to be communicated to a next destination.

14. The method of claim 13, wherein the selected cells may be received and evaluated in order to restore a plurality of bits associated with the communications flow.

15. The method of claim 13, wherein the portions that are suppressed reflect data segments associated with ATM headers, ATM padding, or ATM trailers.

16. The method of claim 15, wherein the ATM headers are mapped to one or more backhaul values.

17. The method of claim 13, further comprising:
    suppressing unused portions of ATM payloads associated with the flow.

18. The method of claim 13, further comprising:
    evaluating bit positions of a current cell to determine an end of a frame.

19. Software for communicating data, the software being embodied in a computer readable medium and comprising computer code such that when executed is operable to:
    receive a plurality of cells associated with a communications flow;
    determine whether one or more of the cells included in the flow should be suppressed;
    suppress a selected one or more of the cells; and
    identify cells that cannot be suppressed and to suppress portions thereof, whereby a cell site element suppresses unused, idle, and redundant information propagating alone a backhaul network coupled to the cell site element, the cell site element inspecting ATM traffic and suppressing empty cells and asynchronous transfer mode (ATM) adaptation layer (AAL) overhead such that they can be reconstructed at a remote end of the backhaul network.

20. The medium of claim 19, wherein the code is further operable to:
    bundle, over a time interval, the selected cells included in the flow in an IP packet to be communicated to a next destination.

21. The medium of claim 20, wherein the selected cells may be received and evaluated in order to restore a plurality of bits associated with the communications flow.

22. The medium of claim 20, wherein the portions that are suppressed reflect data segments associated with ATM headers, ATM padding, or ATM trailers.

23. The medium of claim 22, wherein code is further operable to:
    map the ATM headers to one or more backhaul values.

24. The medium of claim 20, wherein the code is further operable to:
    suppress unused portions of ATM payloads associated with the flow.

25. A system for communicating data, comprising:

means for receiving a plurality of cells associated with a communications flow;

means for determining whether one or more of the cells included in the flow should be suppressed;

means for suppressing a selected one or more of the cells; and means for identifying cells that cannot be suppressed and to suppress portions thereof, whereby a cell site element suppresses unused, idle, and redundant information propagating along a backhaul network coupled to the cell site element, the cell site element inspecting ATM traffic and suppressing empty cells and asynchronous transfer mode (ATM) adaptation layer (AAL) overhead such that they can be reconstructed at a remote end of the backhaul network.

26. The system of claim 25, further comprising:

means for bundling, over a time interval, the selected cells included in the flow in an IP packet to be communicated to a next destination.

27. The system of claim 26, wherein the selected cells may be received and evaluated in order to restore a plurality of bits associated with the communications flow.

28. The system of claim 26, wherein the portions that are suppressed reflect data segments associated with ATM headers, ATM padding, or ATM trailers.

29. The system of claim 28, wherein the ATM headers are mapped to one or more backhaul values.

30. The system of claim 26, further comprising:

means for suppressing unused portions of ATM payloads associated with the flow.

* * * * *